United States Patent
Dilger

(10) Patent No.: US 9,947,227 B1
(45) Date of Patent: Apr. 17, 2018

(54) METHOD OF WARNING A DRIVER OF BLIND ANGLES AND A DEVICE FOR IMPLEMENTING THE METHOD

(71) Applicant: Conti Temic microelectronic GmbH, Nürnberg (DE)

(72) Inventor: Fritz Paul-Emil Dilger, Weißensberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/292,280

(22) Filed: Oct. 13, 2016

(51) Int. Cl.
| | | |
|---|---|---|
| *G08G 1/123* | (2006.01) | |
| *G08G 1/16* | (2006.01) | |
| *B60Q 9/00* | (2006.01) | |
| *B62J 99/00* | (2009.01) | |
| *B62J 3/00* | (2006.01) | |
| *B62J 6/00* | (2006.01) | |

(52) U.S. Cl.
CPC ............ *G08G 1/167* (2013.01); *B60Q 9/008* (2013.01); *B62J 99/00* (2013.01); *G08G 1/164* (2013.01); *G08G 1/166* (2013.01); *B62J 3/00* (2013.01); *B62J 6/001* (2013.01); *B62J 2099/002* (2013.01)

(58) Field of Classification Search
CPC ........ G08G 1/167; G08G 1/166; G08G 1/164; B60Q 9/008; B60R 2300/202
USPC ........................................................ 340/996
See application file for complete search history.

(56) References Cited

U.S. PATENT DOCUMENTS

| | | | | |
|---|---|---|---|---|
| 8,094,190 B2* | 1/2012 | Kubota | ................... | B60Q 9/008 |
| | | | | 348/118 |
| 8,190,355 B2* | 5/2012 | Emam | .................... | G08G 1/167 |
| | | | | 180/169 |
| 8,874,267 B1* | 10/2014 | Dolgov | .................. | G08G 1/167 |
| | | | | 700/253 |
| 9,153,133 B1* | 10/2015 | Lunsford | ............... | G08G 1/167 |
| 9,180,882 B1* | 11/2015 | Dolgov | .................. | G08G 1/167 |
| 2006/0089799 A1* | 4/2006 | Endoh | ..................... | G01S 7/415 |
| | | | | 701/300 |

FOREIGN PATENT DOCUMENTS

| | | |
|---|---|---|
| DE | 102004019651 A1 | 11/2005 |
| DE | 102008012644 A1 | 9/2009 |
| DE | 102012215014 A1 | 2/2014 |

OTHER PUBLICATIONS

Search Report dated Jun. 6, 2016, from corresponding DE Patent Application No. DE 10 2015 220 312.3.

* cited by examiner

*Primary Examiner* — John A Tweel, Jr.

(57) ABSTRACT

A method and a device are disclosed for warning a driver of a first vehicle when the first vehicle is located in a blind spot of a second vehicle. The method includes recording the surrounding area in front of and alongside the first vehicle using a sensor, classifying objects in the recorded surrounding area, determining a relative position of an object classified as a second vehicle in relation to the first vehicle using the sensor, calculating the area of a blind angle on the basis of the determined relative position of the object in relation to the first vehicle, checking whether the first vehicle is located in the calculated area of the blind angle, and generating a warning signal for the driver of the first vehicle when the first vehicle is located in the calculated area of the blind angle.

11 Claims, 2 Drawing Sheets

METHOD OF WARNING A DRIVER OF BLIND ANGLES AND A DEVICE FOR IMPLEMENTING THE METHOD

CROSS REFERENCE TO RELATED APPLICATION

This application claims the benefit of German patent application No. 10 2015 220 312.3, filed Oct. 19, 2015, which is hereby incorporated by reference.

TECHNICAL FIELD

The disclosure relates generally to blind spot monitoring systems and methods.

BACKGROUND

In road traffic, a blind angle designates an area in the surrounding environment of a vehicle which cannot be seen by the driver of the vehicle, even with aids such as a rear-view mirror. Further, in road traffic, a driver of a first vehicle, in particular a motorcycle driver, is often not aware that a driver of a second vehicle cannot see them, and that the first vehicle is therefore located in the blind angle of the second vehicle.

As such, it is desirable to present a method and/or a device which make it possible to attract the attention of the driver of the first vehicle through a warning that they are located in a blind angle of the second vehicle. In addition, other desirable features and characteristics will become apparent from the subsequent summary and detailed description, and the appended claims, taken in conjunction with the accompanying drawings and this background.

SUMMARY

A method serves to warn a driver of a first vehicle when the first vehicle is located in a calculated area of a blind angle of a second vehicle in the area surrounding the first vehicle. The method includes recording of the surrounding area in front of and alongside the first vehicle using a sensor. The sensor can, for example, be a radar sensor. In one embodiment, the radar sensor has a relatively small range, such as a range of approximately 60 m. To the extent that a higher performance radar sensor is used with a broad recording area in the immediate area and/or a large range, e.g., a range of up to 250 m, then such a radar sensor additionally makes automatic distance regulation (Adaptive Cruise Control, ACC) possible. This is in particular advantageous since large long-distance motorcycles already have a cruise control function.

In one exemplary embodiment of the method, a classification is made of objects in the recorded surrounding area. Classification may be performed using a process for recording a surrounding area. During the classification process, the sensor data is evaluated, wherein a differentiation can be made for example between vehicles and other objects. If a vehicle is detected in the radar image, it can be classified as the second vehicle, e.g., using a comparison between the sensor data and vehicle data from a database or using a classification algorithm.

A determination then follows of a relative position of an object classified as the second vehicle in relation to the first vehicle using a sensor, in particular a radar sensor. The area of the blind angle is then determined on the basis of the determined relative position of the object to the first vehicle, a check is made as to whether the first vehicle is located in the calculated area of the blind angle, and a warning signal is generated for the driver of the first vehicle when the first vehicle is located in the calculated area of the blind angle. Here, the calculation is made using an algorithm which contains a geometric calculation of the surface and thus of the area which corresponds to an anticipated area of the blind angle of the object and/or of the second vehicle. The warning signal can for example be a visual or an acoustic signal. It is provided in particular that the warning signal is realized via a yellow flashing warning lamp in the cockpit or a flashing alternating background illumination of a display instrument, e.g. a speed display, a rotational speed measuring device, etc.

The method according to one exemplary embodiment makes it possible for the driver of the first vehicle to ascertain whether the positions of the first and second vehicle in relation to each other lead to the fact that the driver of the second vehicle cannot see the first vehicle, in particular in their rear-view mirrors. If this is the case, and/or this is ascertained in accordance with the method, a warning signal is issued to the driver of the first vehicle. As a result, the level of safety can be further increased for the people in the first and second vehicle, and for people in their surrounding environment.

According to one embodiment, it is advantageously provided that in order to determine the relative position of an object classified as the second vehicle in relation to the first vehicle using the sensor, it is determined whether the object is located in the vehicle lane of the first vehicle or in a lane to the right or left alongside the first vehicle, which lateral distance the object has to the first vehicle, and which longitudinal distance the object has to the first vehicle. In this context, the longitudinal distance is in particular to be understood as being the distance between the second vehicle and the first vehicle in the longitudinal direction of the first vehicle. Using this data—regardless of which type the second vehicle is—a sufficiently precise calculation of the blind angle can be conducted, with a particularly low level of computing complexity required, wherein the driver of the first vehicle receives a warning which is generated on the basis of the spatial situation.

Further, the calculation of the area of the blind angle on the basis of the determined relative position of the object classified as the second vehicle in relation to the first vehicle can additionally be conducted on the basis of a position and type of a rear-view mirror of the second vehicle and a possible direction of view of a driver of the second vehicle in relation to the position of the rear-view mirror. This embodiment makes it possible for areas which can be viewed through the rear-view mirror not to all in the calculated area of the blind angle. As a result, the calculation of the area of the blind angle is particularly precise and permits a differentiation between different vehicle types and the coverage of spatial conditions.

According to a further embodiment, it is advantageously provided that a velocity of the first vehicle is determined. Here, for example, recourse can be made to a velocity measurement already provided in a vehicle. Further, a relative velocity of the object classified as the second vehicle is determined using the sensor in relation to its own velocity, i.e. the velocity of the first vehicle. A check is then made as to whether the first vehicle will be located in the calculated area of the blind angle of the second vehicle in the future, on the basis of the determined velocity of the first vehicle and the determined relative velocity of the object classified as the second vehicle in relation to own velocity. A warning signal is then generated if the check shows that the first vehicle will in the future be located in the calculated area of the blind angle of the second vehicle. This embodiment enables an early warning system with regard to a possible future entry of the first vehicle into the area of the blind angle of the second vehicle.

In this context, it advantageously provided that a time period is calculated within which the first vehicle will be located in the calculated area of the blind angle of the second vehicle, if it has been determined that the first vehicle will be located in the calculated area of the blind angle of the second vehicle. The calculated time period is shown to the driver of the first vehicle. As a result, the driver of the first vehicle can make a particularly good assessment as to when and for how long the first vehicle will be located in the area of the blind angle of the second vehicle in the future.

A further embodiment advantageously provides for a generation of the warning signal when the first vehicle is located or will be located in the calculated area of the blind angle of the second vehicle in the future for the duration of a previously specified time period (possibly calculated as a function of the velocity of the first vehicle). In this manner, a time-related threshold value can be determined, by means of which a location of the first vehicle in the area of the blind angle during a tolerable period of time does not lead to a warning signal. This has a particularly advantageous effect on driving comfort, since only those locations of the first vehicle within the area of the blind angle lead to a warning signal which are defined as being no longer within a tolerable period of time. For example, the limit value can be 10 seconds, as a result of which a balance between safety and comfort can be made possible.

According to one exemplary embodiment, a device is configured to implement the method described above. The device includes a sensor, e.g., a radar sensor, which can for example be arranged on the front on a central axle of a motorcycle, e.g., in the area of the headlight or headlights. The sensor is designed to record the surrounding area in front of and alongside the first vehicle and to determine a relative position of an object classified as the second vehicle in relation to the first vehicle. The device is configured to classify objects in the recorded surrounding area, to calculate the area of the blind angle on the basis of the determined relative position of the object in relation to the first vehicle, to check whether the first vehicle is located in the calculated area of the blind angle, and to generate a warning signal for the driver of the first vehicle if the check has shown that the first vehicle is located in the calculated area of the blind angle.

According to one embodiment, it is advantageously provided that the sensor is designed to determine a relative velocity of the object classified as the second vehicle in relation to its own velocity, wherein the device is designed to determine the velocity of the first vehicle, to determine on the basis of the determined velocity of the first vehicle and the determined relative velocity of the object classified as the second vehicle in relation to its own velocity, i.e., to the velocity of the first vehicle, whether the first vehicle will in the future be located in the calculated area of the blind angle of the second vehicle and to generate a warning signal if it is calculated that the first vehicle will in the future be located in the calculated area of the blind angle of the second vehicle.

According to a further embodiment, the sensor is a radar sensor with a broad recording area in the immediate area and/or a large range, for example a range of up to 250 meters. A sensor of this type enables the function of adaptive distance regulation (Adaptive Cruise Control, ACC) in a single appliance or in a single device. This is in particular advantageous since for example large long-distance motorcycles already have a cruise control function.

With regard to the advantages and advantageous embodiments of the device, reference is made, in order to avoid repetition, to the present embodiments in connection with the method and to the description below in connection with the figures, wherein the device includes the elements necessary for the purpose, or can be fitted for this purpose in an extended manner.

Finally, a vehicle according to the invention, in particular a motorcycle, includes a device as described above.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
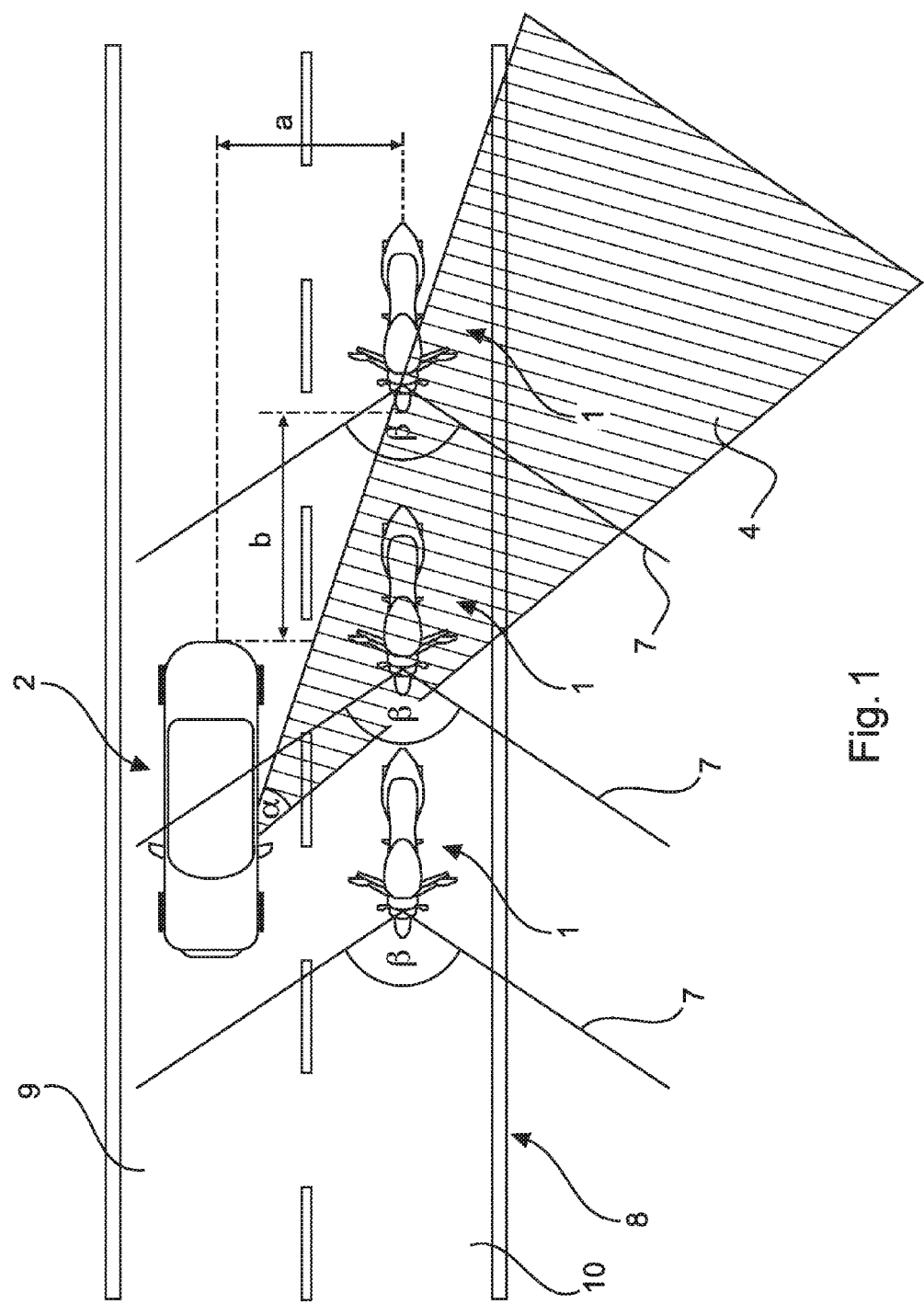
FIG. 1 is a top view onto a road with a first vehicle with an exemplary embodiment of a device in three different relative positions to a second vehicle.

FIG. 1 shows a first vehicle in the form of a motorcycle 1 and a second vehicle in the form of a car. The motorcycle 1 comprises a device 3 (FIGS. 2 and 3) which is designed to warn a driver of the motorcycle 1 when the motorcycle 1 is located in a calculated area 4 of a blind angle $\alpha$ of the car 2 in the area surrounding the motorcycle 1.

Figure 2:
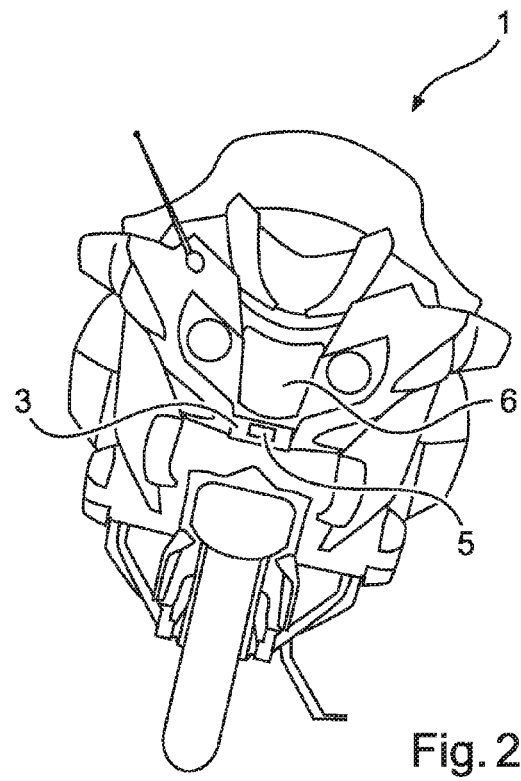
FIG. 2 is a front view of the first vehicle according to one exemplary embodiment with a first possible installation position of the device.
Figure 3:
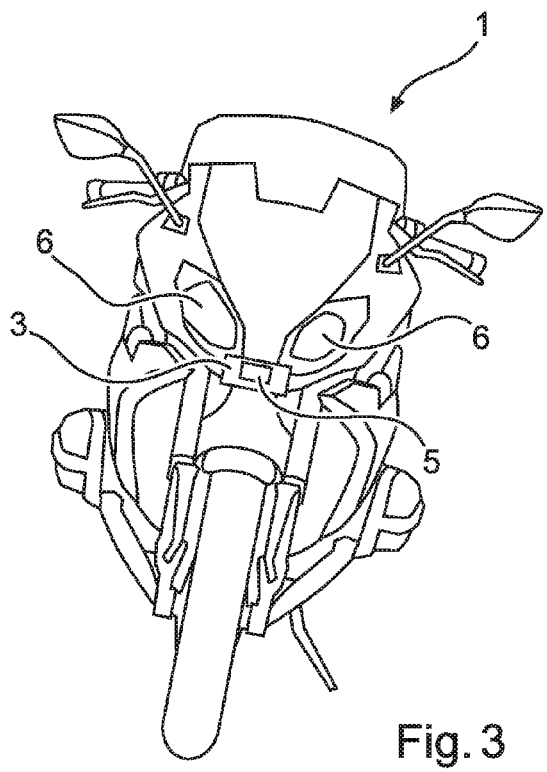
FIG. 3 is a front view of the first vehicle according to another exemplary embodiment with a second possible installation position of the device.

The device 3 includes a radar sensor 5 with a range of up to 250 meters, wherein the radar sensor 5 can be arranged on the front on a central axle of the motorcycle 1 either in the area of a headlight 6 (FIG. 2) or in the area of several headlights 6 (FIG. 3), wherein the arrangement of the device 3 and the sensor 5 shown in FIGS. 2 and 3 is merely an example. The radar sensor 5 is designed to record a surrounding area 7 in front of and alongside the motorcycle 1. The recorded three-dimensional surrounding area 7 is shown in the top view according to FIG. 1 as an example through one sector respectively with the angle $\beta$ in the three positions or position locations shown of the motorcycle 1.

In the scenario shown by FIG. 1, the motorcycle 1 and the car 2 are driving on a road 8 with a right lane 9 and a left lane 10, wherein the car 2 is driving on the right lane 9 and the motorcycle 1 is overtaking on the left lane 10, the progress of which is shown by three exemplary relative positions or position locations of the car 2 in relation to the motorcycle 1.

The device 3, or a computing unit of the device designed for the purpose, classifies objects in the recorded surrounding area 7 using a software program, wherein in the example shown, the car 2 has been classified as being such an object, namely a moving object with certain minimum dimensions.

The radar sensor 5 determines the relative position of the object 2 which is classified as a car in relation to the motorcycle 1. For this purpose, the device 3 uses an algorithm which comprises a geometric calculation of the area 4.

In the scenario shown in FIG. 1, particular account in the geometric calculation is taken of the fact that the car is located on the right-hand lane 9 on the right-hand side alongside the motorcycle 1, the lateral distance a between the car 2 and the motorcycle 1 and the longitudinal distance b between the car 2 and the motorcycle 1. The longitudinal distance b is shown in FIG. 1 as the distance between the rear end of the car 2 and the front end of the motorcycle 1, and is shown only for the position of the motorcycle 1 shown on the outer right-hand side. In the central and left-hand position of the motorcycle 1 shown, the motorcycle 1 is driving at the same level as the car 2, so that there is no longitudinal distance between the motorcycle 1 and the car 2.

On the basis of the relative position of the car 2 determined in relation to the motorcycle 1, the device 3 or its computing unit calculates the area 4 of the blind angle α. Additionally, data regarding a position and type of a rear-view mirror of the car 2 and a possible direction of view of a driver of the car 2 in relation to the position of the rear-view mirror can also be taken into account in the calculation.

The device 3 and/or its computing unit checks whether the motorcycle 1 is located in the calculated area 4 of the blind angle α of the car 2, and generates a warning signal for the driver of the motorcycle 1 when the motorcycle 1 is located in the calculated area 4 of the blind angle α. If the motorcycle 1 is located in the position shown on the right-hand side in FIG. 1, this check is negative (i.e., the motorcycle is not yet located in the calculated area 4 of the blind angle α of the car 2) and no warning signal is generated. If, however, the motorcycle 1 is located in the position shown in the center in FIG. 1, this check is positive (i.e. the motorcycle is now located in the calculated area 4 of the blind angle α of the car 2) and a warning signal is generated. A further precondition for generating the warning signal is that the motorcycle is located in the calculated area 4 of the blind angle α of the car 2 for longer than a defined time period (possibly calculated as a function of the velocity of the first vehicle), e.g., 10 seconds. This precondition is also fulfilled in the central position of the motorcycle 1 shown in FIG. 1. If the motorcycle 1 is then located in the position in the position shown on the left in FIG. 1, this check is in turn negative (i.e., the motorcycle is no longer in the calculated area 4 of the blind angle α of the car 2) and no warning signal is generated.

Further, the device 3 and/or its computing unit determines the velocity of the motorcycle 1, wherein in this regard, data already obtained can be transmitted to the device 3, for example from other units of the motorcycle 1, and does not need to be measured separately by the device 3. The radar sensor 5 further determines a relative velocity of the car 2 in relation to the velocity of the motorcycle 1.

The device 3 is therefore provided with the determined velocity of the motorcycle 1, the determined relative velocity of the car 2 and the calculated area 4 of the blind angle α. The device 3 couples the movements of the motorcycle 1 and of the car 2 on the basis of the determined velocity of the motorcycle 1 and the determined relative velocity of the car 2 in advance and while doing so checks whether the motorcycle 1 will in the future be located in the area 4 of the blind angle α of the car 2. In the example shown in FIG. 1, the motorcycle 1 in its position shown on the right is not yet located in the calculated area 4 of the blind angle α of the car 2. The device ascertains with its check described above, however, that this will be the case in the future, i.e., when the motorcycle 1 is located in the central position shown in FIG. 1 for example, and generates a warning signal in the form of a flashing alternating background illumination of a display instrument of the motorcycle 1.

The device 3 and/or its computing unit further calculates, on the basis of the determined velocity of the motorcycle 1 and the determined relative velocity of the car 2, when entry into the area 4 of the blind angle α of the car 2 will occur, and how long the motorcycle 1 will remain in the area 4 of the blind angle α of the car 2, and shows these two values to the driver of the motorcycle 1, for example in a cockpit of the motorcycle 1.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for warning a driver of a first vehicle when the first vehicle is located in a calculated area of a blind angle of a second vehicle in an area surrounding the first vehicle, the method comprising:
   recording the surrounding area in front of and alongside the first vehicle using a sensor,
   classifying objects in the recorded surrounding area,
   determining a relative position of an object classified as a second vehicle in relation to the first vehicle using the sensor,
   calculating the area of the blind angle on the basis of the determined relative position of the object in relation to the first vehicle,
   checking whether the first vehicle is located in the calculated area of the blind angle, and
   generating a warning signal for the driver of the first vehicle when the first vehicle is located in the calculated area of the blind angle;
   wherein determining the relative position of an object classified as the second vehicle in relation to the first vehicle using the sensor comprises:
      determining whether the object is located in the vehicle lane of the first vehicle or in a lane to the right or left alongside the first vehicle,
      determining a side distance between the object and the first vehicle, and
      determining a longitudinal distance between the object and the first vehicle.

2. The method according to claim 1 wherein calculating the area of the blind angle on the basis of the determined relative position of the object classified as the second vehicle in relation to the first vehicle is additionally conducted on the basis of
   a position and type of a rear-view mirror of the second vehicle, and
   a possible view direction of a driver of the second vehicle in relation to the position of the rear-view mirror.

3. The method according to claim 1, further comprising:
   determining the velocity of the first vehicle,
   determining a relative velocity of the object classified as the second vehicle in relation to the velocity of the first vehicle using the sensor,
   checking whether the first vehicle will, in the future, be located in the calculated area of the blind angle of the second vehicle on the basis of the determined velocity of the first vehicle and the determined relative velocity of the second vehicle, and generating a warning signal if the check shows that the first vehicle will, in the future, be located in the calculated area of the blind angle of the second vehicle.

4. The method according to claim 3, further comprising:
calculating a time period within which the first vehicle will be located in the calculated area of the blind angle of the second vehicle when it has been determined that the first vehicle will be located in the calculated area of the blind angle of the second vehicle, and
displaying the calculated time period.

5. The method according to claim 4, further comprising generating the warning signal when the first vehicle is located or will be located in the calculated area of the blind angle of the second vehicle for the duration of a previously specified time period.

6. A device comprising:
a sensor configured to record the surrounding area in front of and alongside a first vehicle;
a computing unit configured to classify objects in the recorded surrounding area;
the sensor further configured to determine a relative position of an object classified as a second vehicle in relation to the first vehicle, wherein determining the relative position of an object classified as the second vehicle in relation to the first vehicle using the sensor comprises determining whether the object is located in the vehicle lane of the first vehicle or in a lane to the right or left alongside the first vehicle, determining a side distance between the object and the first vehicle, and determining a longitudinal distance between the object and the first vehicle;
the computing unit further configured to calculate an area of a blind angle of the object on the basis of the determined relative position of the object in relation to the first vehicle, to check whether the first vehicle is located in the calculated area of the blind angle, and to generate a warning signal for the driver of the first vehicle when the first vehicle is located in the calculated area of the blind angle.

7. The device according to claim 6, wherein the sensor is configured to determine a relative velocity of the object classified as the second vehicle in relation to the velocity of the first vehicle, wherein the computing unit is configured to determine the velocity of the first vehicle, to use the determined velocity of the first vehicle and the determined relative velocity of the second vehicle in relation to the velocity of the first vehicle to determine whether the first vehicle will, in the future, be located in the calculated area of the blind angle of the second vehicle, and to generate a warning signal if it is calculated that the first vehicle will in the future be located in the calculated area of the blind angle of the second vehicle.

8. The device according to claim 6, wherein the sensor is a radar sensor with a broad recording area in an immediate area and a large range.

9. A motorcycle comprising:
a sensor configured to record the surrounding area in front of and alongside the motorcycle;
a computing unit configured to classify objects in the recorded surrounding area;
the sensor further configured to determine a relative position of an object classified as a vehicle in relation to the motorcycle, wherein determining the relative position of an object classified as the second vehicle in relation to the first vehicle using the sensor comprises determining whether the object is located in the vehicle lane of the first vehicle or in a lane to the right or left alongside the first vehicle, determining a side distance between the object and the first vehicle, and determining a longitudinal distance between the object and the first vehicle;
the computing unit further configured to calculate an area of a blind angle of the vehicle on the basis of the determined relative position of the vehicle in relation to the motorcycle, to check whether the motorcycle is located in the calculated area of the blind angle, and to generate a warning signal for the driver of the motorcycle when the motorcycle is located in the calculated area of the blind angle.

10. The motorcycle according to claim 9, wherein the sensor is configured to determine a relative velocity of the vehicle in relation to the velocity of the motorcycle, wherein the computing unit is configured to determine the velocity of the motorcycle, to use the determined velocity of the motorcycle and the determined relative velocity of the vehicle in relation to the velocity of the motorcycle to determine whether the motorcycle will, in the future, be located in the calculated area of the blind angle of the vehicle, and to generate a warning signal if it is calculated that the motorcycle will in the future be located in the calculated area of the blind angle of the vehicle.

11. A method for warning a driver of a first vehicle when the first vehicle is located in a calculated area of a blind angle of a second vehicle in an area surrounding the first vehicle, the method comprising:
recording the surrounding area in front of and alongside the first vehicle using a sensor,
classifying objects in the recorded surrounding area,
determining a relative position of an object classified as a second vehicle in relation to the first vehicle using the sensor,
calculating the area of the blind angle on the basis of the determined relative position of the object in relation to the first vehicle,
determining the velocity of the first vehicle,
determining a relative velocity of the object classified as the second vehicle in relation to the velocity of the first vehicle using the sensor,
checking whether the first vehicle will, in the future, be located in the calculated area of the blind angle of the second vehicle on the basis of the determined velocity of the first vehicle and the determined relative velocity of the second vehicle,
generating a warning signal if the check shows that the first vehicle will, in the future, be located in the calculated area of the blind angle of the second vehicle,
calculating a time period within which the first vehicle will be located in the calculated area of the blind angle of the second vehicle when it has been determined that the first vehicle will be located in the calculated area of the blind angle of the second vehicle, and
displaying the calculated time period.

* * * * *